(12) United States Patent
Tucker (10) Patent No.: US 10,129,381 B2
(45) Date of Patent: *Nov. 13, 2018

(54) DISABLEMENT OF LOST OR STOLEN DEVICE

(71) Applicant: MICROSOFT TECHNOLOGY LICENSING, LLC, Redmond, WA (US)

(72) Inventor: Nicholas Bradley Tucker, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/447,832

(22) Filed: Mar. 2, 2017

(65) Prior Publication Data

US 2017/0180530 A1    Jun. 22, 2017

Related U.S. Application Data

(63) Continuation of application No. 14/720,765, filed on May 23, 2015, now Pat. No. 9,609,119.

(51) Int. Cl.
*H04M 1/67* (2006.01)
*H04W 12/08* (2009.01)
*H04W 48/02* (2009.01)
*H04M 1/725* (2006.01)

(52) U.S. Cl.
CPC .......... *H04M 1/67* (2013.01); *H04M 1/72577* (2013.01); *H04W 12/08* (2013.01); *H04W 48/02* (2013.01)

(58) Field of Classification Search
CPC ............................... H04W 48/02; H04M 1/67

USPC ................. 455/26.1, 528, 411; 379/161, 200
See application file for complete search history.

(56) References Cited

U.S. PATENT DOCUMENTS

| | | | |
|---|---|---|---|
| 5,715,174 | A | 2/1998 | Cotichini et al. |
| 6,151,678 | A | 11/2000 | Davis |
| 6,542,731 | B1 | 4/2003 | Alos |
| 6,804,699 | B1 | 10/2004 | Henrie |
| 7,260,835 | B2 | 8/2007 | Bajikar |
| 7,355,506 | B2 | 4/2008 | Chandley |

(Continued)

OTHER PUBLICATIONS

"Cerberus Anti Theft", Published on: Jun. 11, 2012. Available at <<https://play.google.com/store/apps/details?id=com.lsdroid.cerberus&hl=en>>.

(Continued)

*Primary Examiner* — Inder Mehra
(74) *Attorney, Agent, or Firm* — Workman Nydegger (57) ABSTRACT

The restricted use of a cellular network to facilitate disablement of a device that is suspected lost or stolen. Accordingly, even if the device is not capable of general use of the cellular network, disablement communications are still permitted across the cellular network. Accordingly, the device may receive a disable command from the disablement service over the cellular network, and acknowledge processing of the disable command to the disablement service also over the cellular network. Thus, efforts by an unauthorized possessor of the device to prevent disablement by removing the physical authentication module are thwarted. Likewise, turning the cellular service off using software settings at the device also does not prevent the device from being disabled via cellular network communication.

24 Claims, 5 Drawing Sheets

(56) References Cited

U.S. PATENT DOCUMENTS

| | | |
|---|---|---|
| 7,446,655 B2 | 11/2008 | Jha et al. |
| 7,786,861 B2 | 8/2010 | Howarth et al. |
| 8,095,150 B2 | 1/2012 | Dunko et al. |
| 8,260,324 B2 | 9/2012 | Jantunen et al. |
| 8,321,916 B2 | 11/2012 | Aissi et al. |
| 8,351,980 B2 | 1/2013 | Wakefield |
| 8,483,659 B2 | 7/2013 | Mahajan |
| 8,555,411 B2 | 10/2013 | Hurwitz |
| 8,577,294 B2 | 11/2013 | Caussey et al. |
| 8,717,172 B2 | 5/2014 | Parker et al. |
| 8,719,909 B2 | 5/2014 | Fitzgerald et al. |
| 2004/0006655 A1 | 1/2004 | Toffolet |
| 2004/0192348 A1 | 9/2004 | Gudmundsson et al. |
| 2004/0203895 A1 | 10/2004 | Balasuriya |
| 2005/0073389 A1* | 4/2005 | Chandley ............... G06F 21/554 340/5.31 |
| 2005/0253714 A1 | 11/2005 | Stephens |
| 2005/0280557 A1 | 12/2005 | Jha et al. |
| 2007/0192652 A1 | 8/2007 | Kao et al. |
| 2008/0070590 A1 | 3/2008 | Miyajima et al. |
| 2008/0186162 A1 | 8/2008 | Rajan et al. |
| 2008/0233919 A1 | 9/2008 | Kenney |
| 2010/0299731 A1 | 11/2010 | Atkinson |
| 2013/0125218 A1 | 5/2013 | Aissi et al. |
| 2013/0326642 A1* | 12/2013 | Hajj ...................... G06F 21/88 726/34 |
| 2014/0038564 A1 | 2/2014 | Mahaffey et al. |
| 2014/0108789 A1 | 4/2014 | Phatak |
| 2014/0146766 A1 | 5/2014 | Porjo et al. |
| 2014/0200929 A1 | 7/2014 | Fitzgerald et al. |
| 2016/0037318 A1 | 2/2016 | Holtmanns et al. |
| 2016/0049975 A1* | 2/2016 | Uy ....................... H04B 1/3816 455/558 |
| 2016/0099972 A1* | 4/2016 | Qureshi ................. H04L 63/20 726/1 |
| 2016/0267298 A1 | 9/2016 | Tucker |
| 2016/0344862 A1 | 11/2016 | Tucker |

OTHER PUBLICATIONS

Henry, Alan, "Smart WiFi Toggler for Android Learns Where Your Networks Are, Toggles Wi-Fi and Data Automatically", Published Nov. 2012. Available at <<http://lifehacker.com/5963802/smart-wifi-toggler-for-android-learns-where-your-networks-are-toggles-wi-fi-and-data-automatically>>.

"Wheres My Droid", Published on: Jun. 4, 2014. Available at <<https://play.google.com/store/apps/details?id=com.alienmanfc6.wheresmyandroid>>.

"SMS GPS Enabler", Published on: Apr. 5, 2013. Available at <<https://play.google.com/store/apps/details?id=com.nelson.gpsenable&hl=en>>.

"Prey Anti Theft", Published on: Aug. 7, 2013. Available at <<https://play.google.com/store/apps/details?id=com.prey>>.

Knoll, "How to Track Your Lost iPhone or iPad Without a Tracking App," Published on Jun. 6, 2014. Available at http://trendblog.net/how-to-track-your-lost-iphone-or-ipad-without-tracking-app/.

Office Action dated Jun. 14, 2016 cited in U.S. Appl. No. 14/657,808.

Office Action dated Jun. 1, 2016 cited in U.S. Appl. No. 14/720,765.

Notice of Allowance dated Oct. 11, 2016 cited in U.S. Appl. No. 14/657,808.

Notice of Allowance dated Dec. 2, 2016 cited in U.S. Appl. No. 14/720,765.

* cited by examiner

DISABLEMENT OF LOST OR STOLEN DEVICE

CROSS-REFERENCE TO RELATED APPLICATIONS

This application is a continuation of U.S. patent application Ser. No. 14/720,765 filed on May 23, 2015, entitled "Disablement of Lost or Stolen Device," and which application is expressly incorporated herein by reference in its entirety.

BACKGROUND

Computing systems and associated networks have revolutionized the way human beings work, play, and communicate. Computing systems come in a wide variety of forms, many of which now being highly mobile. For instance, computing systems may now come in the form of smartphones, tablets, smart watches, fitness trackers, and wearables. Such mobile computing systems are often referred to as "mobile devices" or simply "devices". Such mobile devices are highly capable and often of high value. Accordingly, they are often high-value and easy targets for theft.

There are many solutions that aim to deter theft of such mobile devices. These solutions aim to reduce the value of the mobile device by restricting the usability of the mobile device. For instance, many mobile devices have on-device access measures that perhaps require entry of a secret before allowing the mobile device to be used. Such a user-entered secret might be a Personal Identification Number (PIN) or a password. There are also hardware measures to render mobile systems inoperable. In some cases, a service provider for the mobile device may impose network access restrictions to limit functionality.

One solution is software that allows remote restriction of a stolen or lost device. This solution enables mobile device owners to make their devices useless until recovered (if ever). This deters theft of devices since potential thieves may be aware that their illicit efforts to steal may be for naught, which discourages the effort in the first place.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the restricted use of a cellular network to facilitate disablement of a device that is suspected lost or stolen. Accordingly, even if the device is not capable of general use of the cellular network (e.g., due to a physical authentication module, such as a subscriber identity module, being absent and/or due to a software restriction on cellular network access), disablement communications are still permitted across the cellular network. Accordingly, the device may receive a disable command from the disablement service over the cellular network, and acknowledge processing of the disable command to the disablement service also over the cellular network. Thus, efforts by an unauthorized possessor of the device to prevent disablement by removing the physical authentication module are thwarted. Likewise, turning the cellular service off using software settings at the device also does not prevent the device from being disabled via cellular network communication.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to the restricted use of a cellular network to facilitate disablement of a device that is suspected lost or stolen. Accordingly, even if the device is not capable of general use of the cellular network (e.g., due to a physical authentication module, such as a subscriber identity module, being absent and/or due to a software restriction on cellular network access), disablement communications are still permitted across the cellular network. Accordingly, the device may receive a disable command from the disablement service over the cellular network, and acknowledge processing of the disable command to the disablement service also over the cellular network. Thus, efforts by an unauthorized possessor of the device to prevent disablement by removing the physical authentication module are thwarted. Likewise, turning the cellular service off using software settings at the device also does not prevent the device from being disabled via cellular network communication.

Some introductory discussion of a computing system will be described with respect to FIG. 1. Then, the structure and operation of embodiments described herein will be presented with respect to subsequent figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor.

The memory may take any form and may depend on the nature and form of the computing system. A computing system may be distributed over a network environment and may include multiple constituent computing systems.

Figure 1:
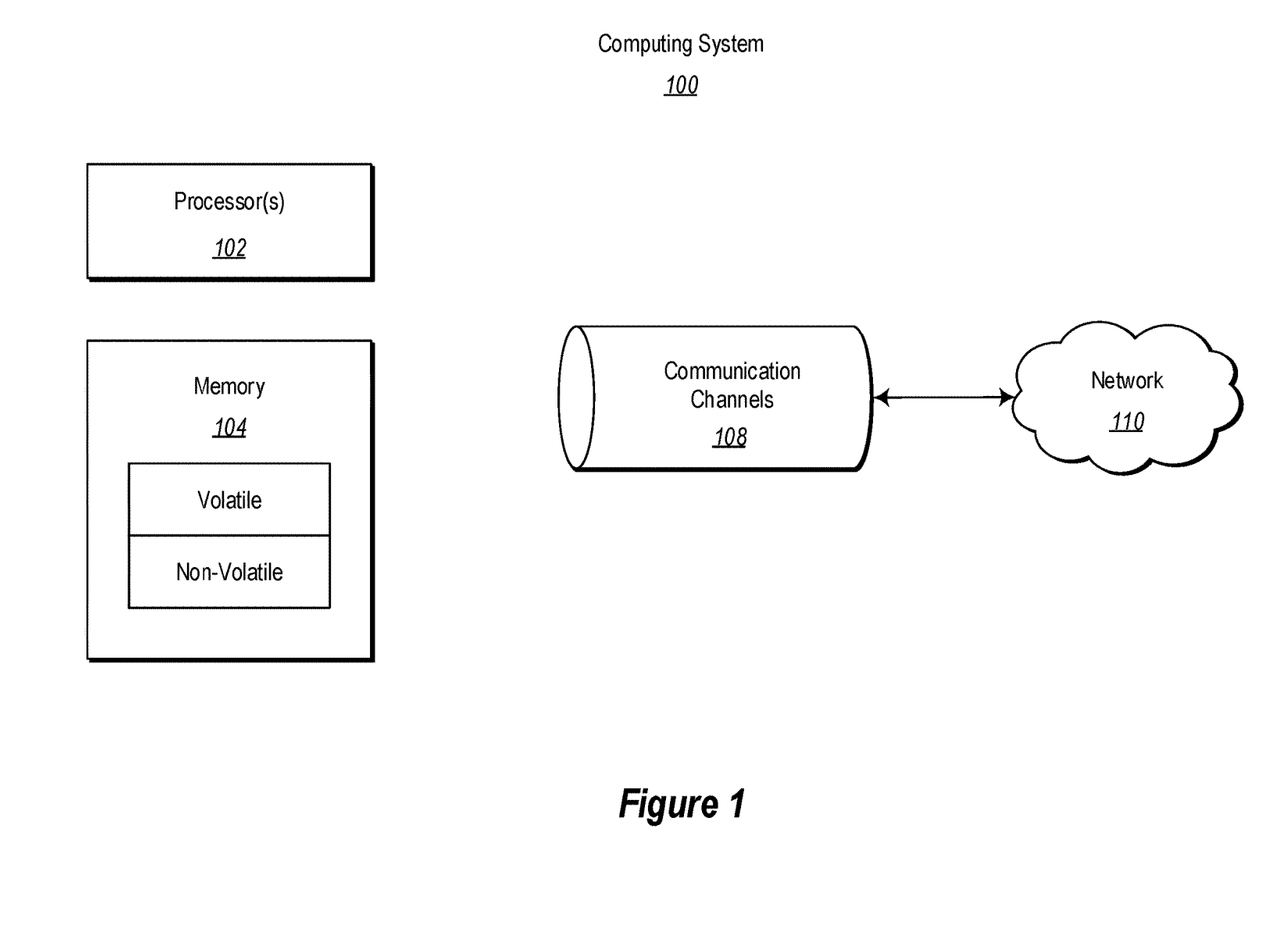
FIG. 1 abstractly illustrates a computing system in which some embodiments described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors (of the associated computing system that performs the act) direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
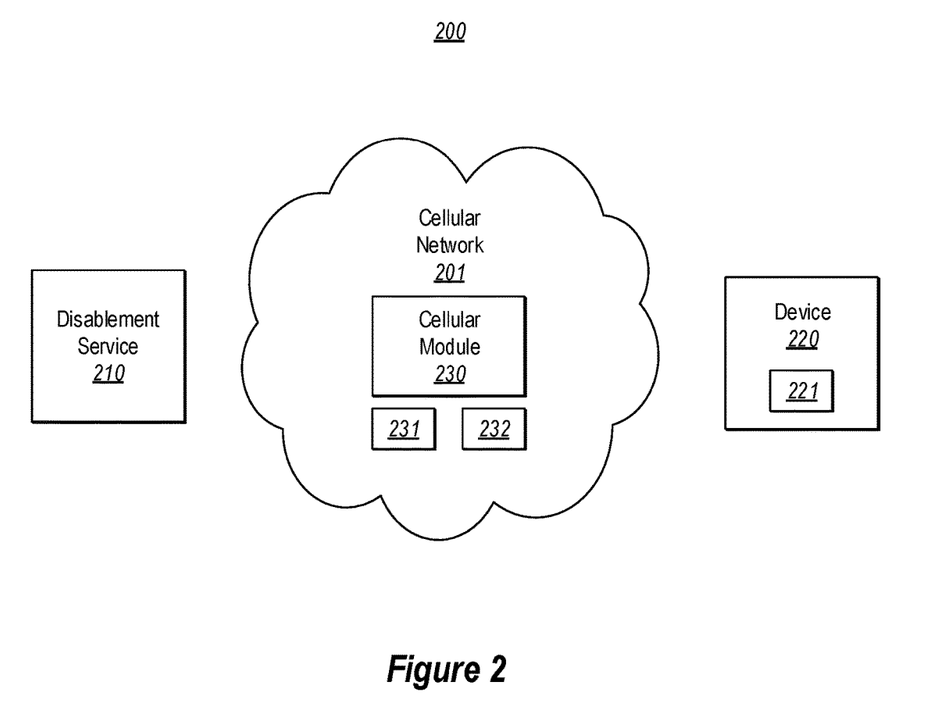
FIG. 2 illustrates a network environment in which the principles described herein may operate.

FIG. 2 illustrates a network environment 200 in which the principles described herein may operate. The network environment 200 includes disablement service 210 and a device 220 communicating over a cellular network 201. The cellular network 201 includes a cellular access management module 230 that is capable of facilitating communications over the cellular network 201. Each of the service 210, the device 220 and the cellular access management module 230 may be structured and operate as described above for the computing system 100 of FIG. 1. As an example, the device 220 may be a mobile device, such as a laptop, smartphone, smartwatch, wearable, or the like.

The disablement service 210 may be a cloud computing environment, a cluster of servers, or even a single server. The disablement service 210 operates to assist in the partial or full disabling of the device 220 once the device 220 is suspected as lost or stolen, despite there only being restricted use of the cellular network 201 available between the disablement service 210 and the device 220. Under such restricted use, there is still permitted to be disablement communications between the disablement service 210 and the device 220. Thus, even with restricted use of the cellular network 201, the disablement service 210 may successfully communicate a disable command to the device 220 over the cellular network 201. Also, under such restricted use of the cellular network 201, the device 220 may successfully confirm processing of the disable command back to the disablement service 210 over the cellular network 201. Such a confirmation might include, for instance, success in disabling the device 220 as instructed, an approximate location of the device, or perhaps failure to disable the device as instructed. In addition, other information relevant to the operation of an anti-theft feature might also be sent over such a connection.

The restricted use of the cellular network 201 may be enforced by either or both of the cellular network 201 or the device 220 itself. In the case of the cellular network 201 enforcing the restricted use, the cellular access management module 230 enforces restricted use. In particular, the cellular access management module 230 keeps track of whether the device 220 has general use authorization 231 to communicate over the cellular network, or has restricted use authorization 232 to communicate over the cellular network. Restricted user authorization 232 might be appropriate if, for instance, the device 220 is not even physically capable of achieving general use authorization 231. Such lack of capability might be the case if a physical authentication module (e.g., a subscriber identifier module such as a "SIM" card) has been removed from the device 220. For instance, perhaps a thief has removed the physical authentication module from the device 220, in order to prevent remote disablement of the device 220.

In the case of the device 220 enforcing the restricted use, software (e.g., module 221) on the device 220 prohibits the general use of the cellular network 201, regardless of whether the cellular access management module 230 has the device 220 registered for general use authorization 231 or restricted use authorization 232. As an example, perhaps a configuration setting of the operating system has the cellular service turned off (though the configuration setting does not disable restricted use). In that case, the operating system of the device 220 may refer to that configuration setting to determine that general use is prohibited, and in response, refrain from general use of the cellular network.

Figure 3:
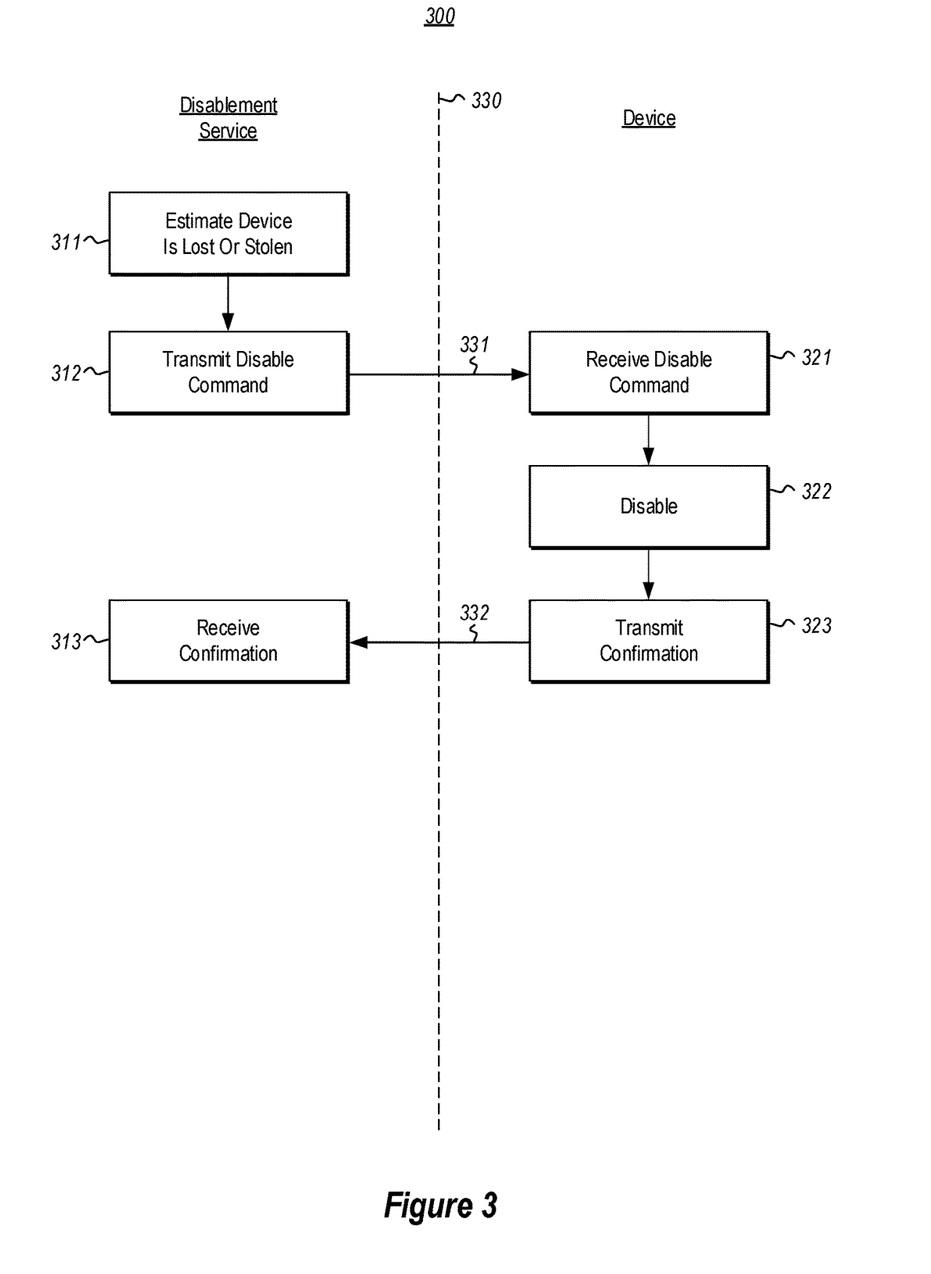
FIG. 3 illustrates a flowchart of a method for at least partially disabling a device that is reported lost or stolen.

FIG. 3 illustrates a flowchart of a method 300 for at least partially disabling a device that is reported lost or stolen. Some of the acts of the method 300 are performed by the disablement service 210 as represented in the left column of FIG. 3 under the heading "Disablement Service", and which acts are labelled in the 310's. Some of the acts of the method 300 are performed by the device 220 as represented in the right column of FIG. 3 under the heading "Device", and which acts are labelled in the 320's.

Figure 5:
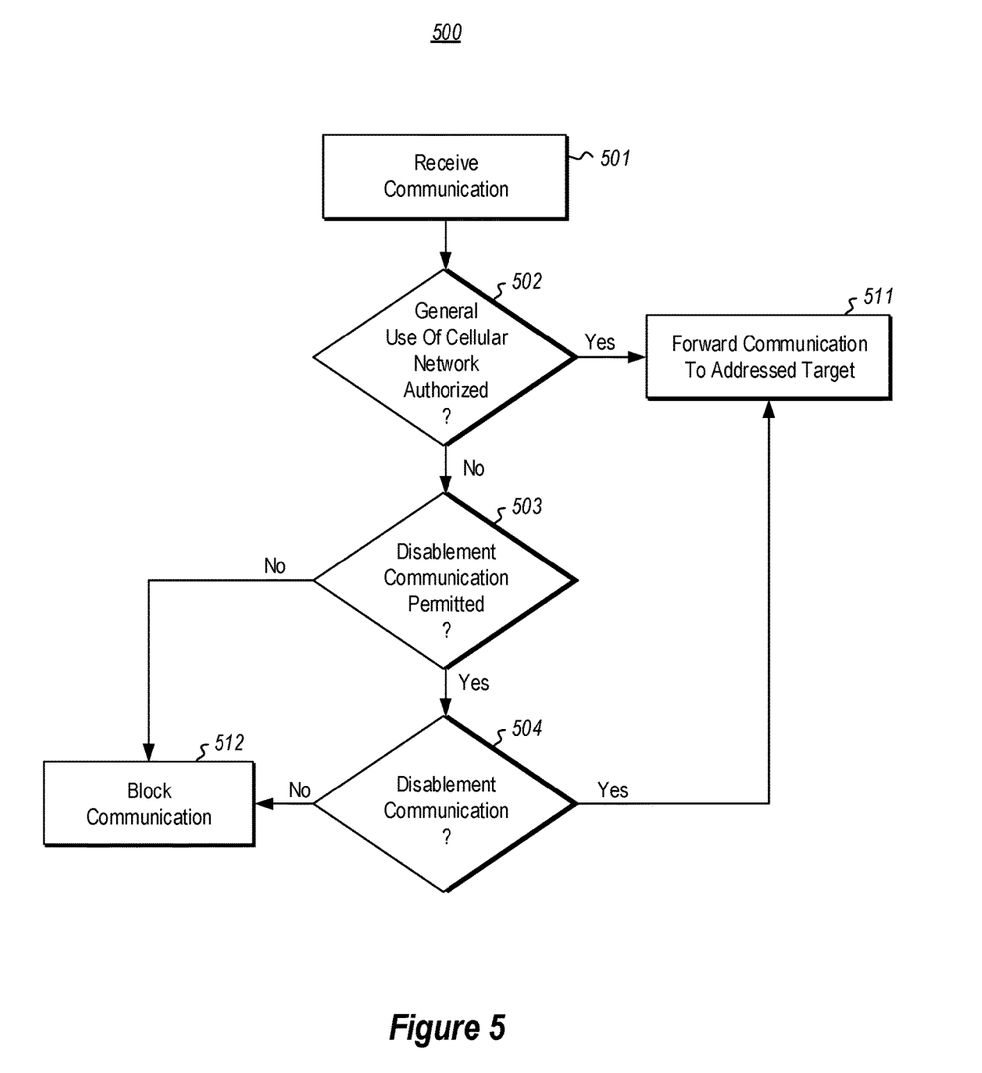
FIG. 5 illustrates a flowchart of a method for handling a communication over the cellular network.

Note that there are a number of communications that go back and forth between the disablement service 210 and the device 220, as represented by the arrows that traverse over line 330. Each time a communication traverses over the line 330, this represents a communication over the cellular network, such as cellular network 201 of FIG. 2. FIG. 5 illustrates a flowchart of a method 500 for handling a communication over the cellular network. Accordingly, the method 500 may be performed each time a communication is made over the cellular network between the disablement service 210 and the device 220. Nevertheless, the method 300 of FIG. 3 will first be described on the presumption that only restricted use of the cellular network 201 is permitted such that while general use of the cellular network 201 is not permitted, disablement communications may still be communicated over the cellular network 201 between the disablement service 210 and the device 220

Referring to FIG. 3, the disablement service 210 estimates that the device 220 is lost or stolen (act 311). For instance, a user or agent of the user may report that the device 220 is lost or stolen to the disablement service 210. Alternatively or in addition, the device 220 may have experienced a condition indicative of being lost or stolen (such as a certain number of failed login attempts). In that case, the device 220 itself may report to the disablement service 210 of such a condition.

Responsive to this estimation (act 311), the disablement service 210 transmits a disable command (act 312) over the cellular network to the device 220. This communication is represented in FIG. 3 by arrow 331, which crosses the line 330.

As previously mentioned, an arrow crossing the line 330 represents that method 500 is invoked (e.g., on device 220), which allows disablement communications (such as the disable command) over the cellular network 201 even when the device 220 has only restricted use of the cellular network 201.

The device 220 then receives the disable command (act 321) over the cellular network despite the device 220 not having general use of the cellular network. This is because the disable command is a disablement communication signal that is permitted for communication under the restricted use of the cellular network 201.

In response to the disable command, the device 220 disables or at least partially disables the device (act 322). The types of disable commands and/or disablement may be wide ranging, but may all share the characteristic that the value of the target device is reduced as a result of the disablement. However, the principles described herein are not limited to the manner or completeness of the disablement that diminishes the functionality of the device 220.

For instance, the disablement may inhibit the use of the target device to the non-owner in possession, and persists across power cycles (e.g., reboots) of the device 220. As examples, the disable command may be a device wipe command that is structured to be interpretable by the target device as instructing removal of personal data and restoring the system to factory defaults. Alternatively or in addition, the disable command might be a software downgrade command that is structured to be interpretable by the target device as instructing a software downgrade on the target device. Alternatively or in addition, the disable command might be a software removal command that is structured to be interpretable by the target device as instructing a software removal on the target device.

The device 220 then transmits a confirmation (act 323) that the processing of the disable command has been performed on the device 220. Estimated or determined location of the target device may also be communicated. The communication of the confirmation from the device 220 to the disablement service 210 over the cellular network 201 is represented by arrow 332. Again, the arrow 332 crosses the line 301, thereby representing that this communication invokes again the method 500 of FIG. 5. This confirmation is also a disablement communication that is permitted even under restricted use of the cellular network 201. In some embodiments, confirmation (represented by arrow 332) may be eliminated. However, the confirmation is helpful as it closes the loop on the disablement, thereby allowing the disablement service 210 and the user notice that the disablement was completed (or failed).

The confirmation signal is then received by the disablement service (act 313). The disablement service 210 may then take appropriate action such as noting the confirmation, reporting to the authorized user of the device 220, and so forth. The disablement service 210 might also use the confirmation signal to perform big data analytics. For instance, when aggregating confirmation signals from numerous devices suspected as lost or stolen, the flow of stolen devices may be tracked, perhaps assisting law enforcement.

In some embodiments, the device 220 might first send a disablement facilitation signal to the disablement service 210 to thereby trigger the disablement service 210 to initiate the method 300. Such might be the case if, for instance, the device 220 is turned on airplane mode thereby completely eliminating any capability for the device 220 communicating with the cellular network 201. In that case, the device 220 might periodically wake up to a point where it can at least transmit the disablement facilitation signal, and stay awake for sufficient time for the disablement service 210 to synchronously send the disablement command.

Figure 4:
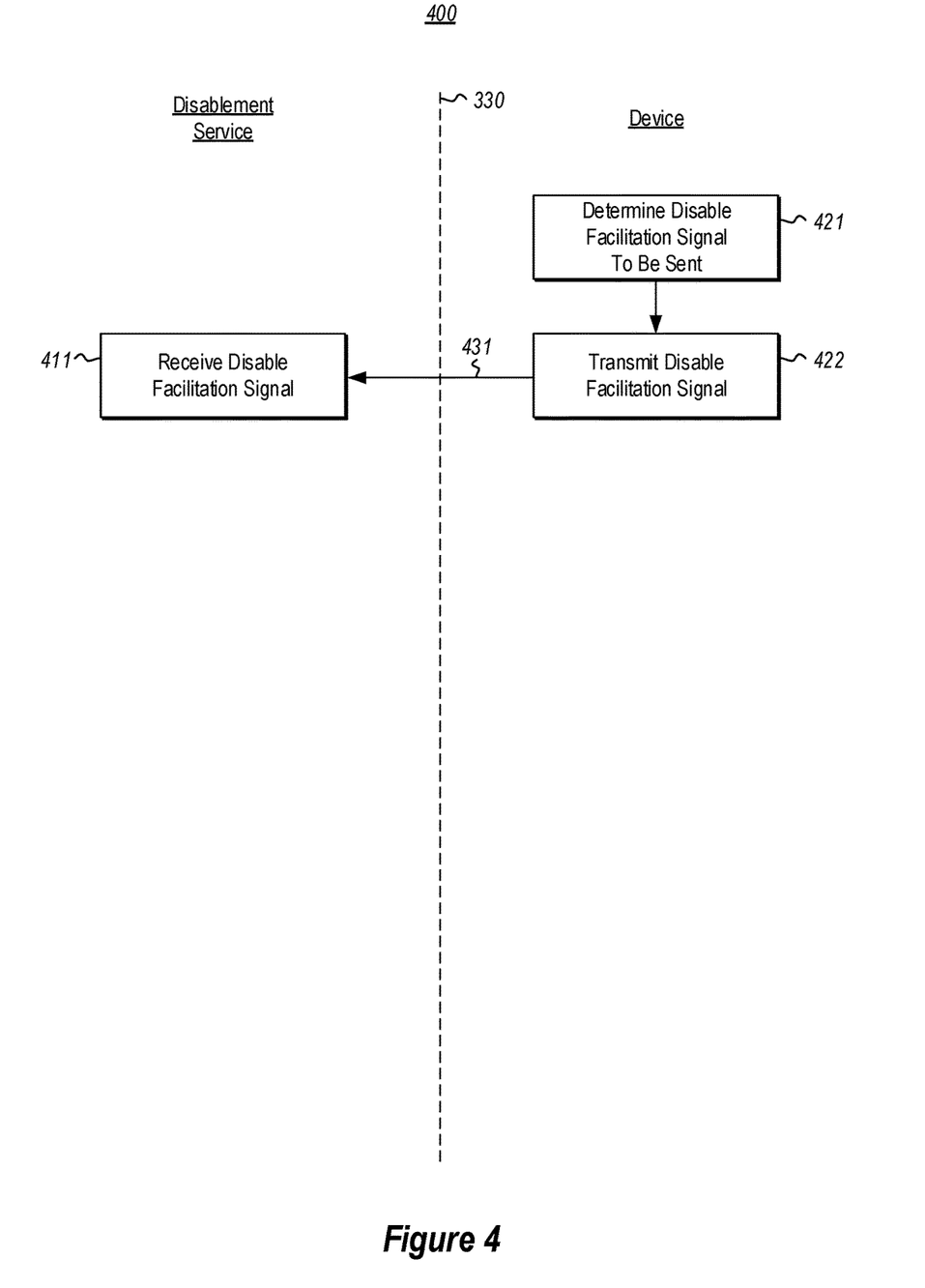
FIG. 4 illustrates a flowchart of a method for the device to trigger its own disablement through the use of a disablement facilitation signal.

FIG. 4 illustrates a flowchart of a method 400 for the device 220 to trigger its own disablement through the use of a disablement facilitation signal. Again, acts performed by the disablement service 210 are represented in the left column of FIG. 4 under the heading "Disablement Service". Acts that are performed by the device 220 are represented in the right column of FIG. 4 under the heading "Device". Likewise, communications that are represented by arrows that traverse line 330 represent that method 500 of FIG. 5 is invoked.

The device 220 first determines that a disable facilitation signal is to be sent (act 421). For instance, while in airplane mode, the device 220 may periodically wake to allow restricted use of the cellular network. Upon awaking, the device 220 may determine that the disable facilitation signal is to be sent. Alternatively or in addition, the device 220 may detect that there are conditions that exist that represent the potential that the device has been lost or stolen. For instance, perhaps the device has been subjected to a certain number of failed login attempts or other evidence of tampering. The disable facilitation signal need not be complicated, and might even just include self-identification data, and perhaps also location information.

The device 220 then transmits the disable facilitation signal (act 422) to the disablement service 210 as represented by arrow 431. The disable facilitation signal is a disablement communication that is permitted by the restricted use of the cellular network 201. Accordingly, the disablement service 210 receives the disable facilitation signal (act 411). Furthermore, because arrow 431 crosses the line 431, this communication invokes the performance of the method 500 of FIG. 5. This receipt (act 411) may then trigger the performance of method 300 of FIG. 3.

Recall that each time a disablement communication is communicated over the cellular network (such as in arrow 331, 332, or 431), the method 500 of FIG. 5 is performed. FIG. 5 illustrates a flowchart of a method 500 for facilitating disablement communication over a cellular network. If the restricted use is enforced by the module 221 of the device 220, the method 500 may be performed by the module 221. Alternatively or in addition, if the restricted use is enforced by the cellular access management module 230, the method 500 may be performed by, for instance, the cellular access management module 230 within the cellular network 201. In some cases, both the cellular access management module 230 and the software 221 might perform the method 500 for each communication.

Upon receiving a communication over the cellular network (act 501), the relevant decision module (e.g., the cellular access management module 230 in the case of the cellular network 201 imposing the restricted use, or the module 221 in the case of the device 220 imposing the restricted use) determines whether or not general use of the cellular network is authorized (decision block 502) for the device 220 that received (or is to receive), or that transmitted (or is to transmit) the communication. If the general use of the cellular network is authorized ("Yes" in decision block 502), then the communication is forwarded to the addressed destination of the communication (act 411). For instance, if the module 221 first performs the method 500 (e.g., for a communication from the device 220 to the disablement service 210), the module 221 would allow the operating system of the device 220 to forward the communication over the cellular network 201. The cellular access management module 230 might then also perform the method 500. If the cellular access management module 230 first performs the method 500 (e.g., for a communication from the disablement service 210 to the device 220), the cellular access management module 230 would forward the communication over the device 220. The module 221 might then also perform the method 500.

On the other hand, if general use of the cellular network is not authorized ("No" in decision block 502) for the device 220, the relevant decision module determines that disablement communications are permitted (decision 503) to and from the device 220. For instance, if the method 500 is performed by the cellular access management module 230, the cellular access management module 230 might determine that the device 220 has restricted use authorization 232. Alternatively, if the method 500 is performed by the module 221, then the module 221 might determine that restricted use is permitted. If disablement communications are not permitted ("No" in decision block 503), then the communication is blocked (act 512).

If the disablement communications are permitted ("Yes" in decision block 503), the decision module determines whether the communication is a disablement communication (decision block 504). If the communication is not a disablement communication ("No" in decision block 504), then the communication is not permitted (act 512). However, if the communication is a disablement communication ("Yes" in decision block 504), then the communication is forwarded over the cellular network towards the addressed destination of the communication (act 511) despite there not being general use authorization for the device. Of course, for emergency calls (such as 911 calls in the United States), it is well preferred that once those communications are received (act 501), the communication is immediately forwarded to the destined emergency responder, and subsequent communications related to that call, also be immediately permitted.

Accordingly, the principles described herein allow a device to be remotely disabled over a cellular network even if the device has its physical authentication module (e.g., a subscriber identifier module such as a "SIM" card) removed and/or even if the software of the device may prohibit the obtaining of the general use authorization for the cellular network. This allows features of the device to be disabled more reliably, and to thwart attempts by authorized possessors of the device to prevent disablement.

Claim Support Section

Embodiments described herein are directed to a method for a device to at least partially disable in response to a remote instruction to disable and despite general internet connectivity not being available. The method comprises: an act of receiving a disable command over the cellular network using a restricted use authorization of the cellular network, the restricted use authorization permitting restricted use of the cellular network including the communication of disablement communications to and from the device, but not permitting general use of the cellular network, the disable command being a disablement communication permitted within the restricted use of the cellular network; and an act of at least partially disabling the device in response to the disable command.

In some embodiments, the device is not physically capable of obtaining general use authorization for the general use of the cellular network. For instance, the device might be missing a physical authentication module that is required to be physically capable of obtaining the general use authorization of the cellular network. The physical authentication module could be a subscriber identity module.

In some embodiments, the device has or is physically capable of obtaining general use authorization for the general use of the cellular network, but software on the device prohibits the general use of the cellular network, while allowing the restricted use of the cellular network.

In some embodiments, the method further includes the following: an act of determining that a disablement facilitation signal is to be transmitted over the cellular network; and an act of transmitting the disablement facilitation signal over the cellular network using the restricted use authorization. The disablement facilitation signal is a disablement communication permitted within the restricted use of the cellular network, the disable command being responsive to the disablement facilitation signal.

In some embodiments, the method further includes an act of transmitting a confirmation that the disable command has been processed on the device, the confirmation being a disablement communication permitted within the restricted use of the cellular network.

The disable command may be, for example, a software wipe command that is structured to be interpretable by the device as instructing removal of personal data and restoring the system to factory defaults, a software downgrade command that is structured to be interpretable by the device as instructing a software downgrade on the device, a software removal command that is structured to be interpretable by the device as instructing a software removal on the device.

In accordance with embodiments described herein, a computer program product comprises one or more computer-readable media having thereon computer-executable instructions that are structured such that, when executed by one or more processors of a computing system, cause the computing system to perform a method for communicating disablement communications over a cellular network, the method comprising: an act of receiving a communication over a cellular network, the communication from or to a device; an act of determining that general use of the cellular network is not authorized, but that restricted use of the cellular network is authorized, the restricted use authorization permitting disablement communication to and from the device from and to at least a disablement service that issues commands to disable devices over the cellular network; an act of the identifying the communication as permitted under the restricted use authorization; and an act of forwarding the communication over the cellular network to the addressed destination of the communication despite there not being general use authorization for the device.

In some embodiments, with respect to the device, any disablement communication is permitted using the restricted use authorization, and the act of identifying the communication as permitted under the restricted use authorization comprises an act of identifying the communication as a disablement communication.

In some embodiments, with respect to the disablement service, any disablement communication is permitted using the restricted use authorization, and the act of identifying the communication as permitted under the restricted use authorization comprises an act of identifying the communication as a disablement communication that is from and/or to the disablement service.

In some embodiments, with respect to the disablement service and the device, disablement communications are permitted between the disablement service and the device, and the act of identifying the communication as permitted under the restricted use authorization comprises an act of identifying the communication as a disablement communication between the device and the disablement service.

In some embodiments, the received communication is received from the device over the cellular network, and the act of forwarding the communication over the cellular network to the addressed destination comprises an act of forwarding the communication to a disablement service.

In some embodiments, the communication is a disable facilitation signal notifying the disablement service of readiness to receive a disable command. In some embodiments, the communication is an acknowledgment signal notifying the disablement service of processing of the disable command on the device.

In some embodiments, the received communication is addressed to the device, and the act of forwarding the disablement communication over the cellular network further comprises an act of forwarding the disablement communication to the device.

Some embodiments described herein relate to a computer program product comprising one or more computer-readable storage media having thereon computer-executable instructions that are structured such that, when executed by one or more processors of the computing system, cause the computing system to perform a method for a device to at least partially disable in response to a remote disable command despite general internet connectivity not being available, the method comprising: in response to receiving a disable command over the cellular network using the limited use of the cellular network, the disable command being permitted to be communicated over the cellular network within a restricted use authorization of the cellular network, an act of at least partially disabling the device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method of persisting a cellular network connection, to be used only for communication between local and remote elements of disablement software at the device, even when network connectivity has been otherwise disabled such as by software controls and such as by removing access credentials, comprising:
   receiving at a disablement service that communicates over a cellular network with a mobile device an indication that the mobile device that uses the cellular network needs to be disabled;
   transmitting over the cellular network a disable command to the mobile device, wherein the disable command comprises a disablement communication signal that provides for communication even under restricted use of the cellular network, and wherein the disablement communication signal persists across power cycles of the mobile device so that the disablement communication signal is provided to the mobile device even when cellular network connectivity to the mobile device has been disabled such as by disabling software controls on the device and such as by removing a physical authentication card of the device;
   receiving the disable command at the mobile device; and
   performing a disable action on the mobile device in accordance with the received disable command.

2. The computer-implemented method of claim 1, further comprising transmitting over the cellular network to the disablement service a confirmation from the mobile device that the disable command was received, wherein the confirmation is configured for the restricted use of the cellular network.

3. The computer-implemented method of claim 2, wherein receiving at the disablement service that communicates over the cellular network with the mobile device an indication that the mobile device that uses the cellular network needs to be disabled comprises:
   determining at the mobile device that there is an indication that the mobile device has been lost or stolen;
   transmitting over the cellular network a disable facilitation signal from the mobile device to the disablement service, wherein the disable facilitation signal is configured for restricted use of the cellular network;
   receiving at the disablement service the disable facilitation signal; and
   in response to receiving the disable facilitation signal, transmitting the disable command over the cellular network to the mobile device.

4. The computer-implemented method in accordance with claim 1, wherein the disable command is a software wipe command and wherein the disable action comprises removal of personal data and restoring the system of the mobile device to factory defaults.

5. The computer-implemented method in accordance with claim 1, wherein the disable command is a software downgrade command and wherein the disable action comprises performing a software downgrade on the mobile device.

6. The computer-implemented method in accordance with claim 1, wherein the disable command is a software removal command and wherein the disable action comprises removal of specified software on the mobile device.

7. One or more computer-readable storage media storing executable instructions which, when executed by one or more processors, perform a computer-implemented method of persisting a cellular network connection, to be used only for communication between local and remote elements of disablement software at the device, even when network connectivity has been otherwise disabled such as by software controls and such as by removing access credentials, and wherein the stored executable instructions cause the computer-implemented method to perform the following:
   receive at a disablement service that communicates over a cellular network with a mobile device an indication that the mobile device that uses the cellular network needs to be disabled;
   transmit over the cellular network a disable command to the mobile device, wherein the disable command comprises a disablement communication signal that provides for communication even under restricted use of the cellular network, and wherein the disablement communication signal persists across power cycles of the mobile device so that the disablement communication signal is provided to the mobile device even when cellular network connectivity to the mobile device has been disabled such as by disabling software controls on the device and such as by removing a physical authentication card of the device;
   receive the disable command at the mobile device; and
   perform a disable action on the mobile device in accordance with the received disable command.

8. The computer program product of claim 7, further comprising transmitting over the cellular network to the disablement service a confirmation from the mobile device that the disable command was received, wherein the confirmation is configured for the restricted use of the cellular network.

9. The computer program product of claim 8, wherein causing the method to receive at the disablement service that communicates over the cellular network with the mobile device an indication that the mobile device that uses the cellular network needs to be disabled comprises:
   determining at the mobile device that there is an indication that the mobile device has been lost or stolen;
   transmitting over the cellular network a disable facilitation signal from the mobile device to the disablement service, wherein the disable facilitation signal is configured for restricted use of the cellular network;
   receiving at the disablement service the disable facilitation signal; and
   in response to receiving the disable facilitation signal, transmitting the disable command over the cellular network to the mobile device.

10. The computer program product in accordance with claim 7, wherein the disable command is a software wipe command and wherein the disable action comprises removal of personal data and restoring the system of the mobile device to factory defaults.

11. The computer program product in accordance with claim 7, wherein the disable command is a software downgrade command and wherein the disable action comprises performing a software downgrade on the mobile device.

12. The computer program product in accordance with claim 7, wherein the disable command is a software removal command and wherein the disable action comprises removal of specified software on the mobile device.

13. A computer environment system configured with an architecture that persists a cellular network connection, to be used only for communication between local and remote elements of disablement software at the device, even when network connectivity has been otherwise disabled such as by software controls and such as by removing access credentials, comprising:

a disablement service that communicates over a cellular network with a mobile device and is configured to receive an indication that the mobile device needs to be disabled;

a cellular network that is configured to transmit over the cellular network a disable command to the mobile device, wherein the disable command comprises a disablement communication signal that provides for communication even under restricted use of the cellular network, and wherein the disablement communication signal persists across power cycles of the mobile device so that the disablement communication signal is provided to the mobile device even when cellular network connectivity to the mobile device has been disabled such as by disabling software controls on the device and such as by removing a physical authentication card of the device;

wherein the mobile device is configured to receive the disable command; and wherein the mobile device is configured to perform a disable action on the mobile device in accordance with the received disable command.

14. The computer environment system of claim 13, wherein a confirmation from the mobile device is transmitted over the cellular network to the disablement service that the disable command was received, and wherein the confirmation is configured for the restricted use of the cellular network.

15. The computer environment system of claim 14, wherein configuring the disablement service to receive at the disablement service that communicates over the cellular network with the mobile device an indication that the mobile device that uses the cellular network needs to be disabled comprises:

determining at the mobile device that there is an indication that the mobile device has been lost or stolen;

transmitting over the cellular network a disable facilitation signal from the mobile device to the disablement service, wherein the disable facilitation signal is configured for restricted use of the cellular network;

receiving at the disablement service the disable facilitation signal; and in response to receiving the disable facilitation signal, transmitting the disable command over the cellular network to the mobile device.

16. The computer environment system in accordance with claim 13, wherein the disable command is a software wipe command and wherein the disable action comprises removal of personal data and restoring the system of the mobile device to factory defaults.

17. The computer environment system in accordance with claim 13, wherein the disable command is a software downgrade command and wherein the disable action comprises performing a software downgrade on the mobile device.

18. The computer environment system in accordance with claim 13, wherein the disable command is a software removal command and wherein the disable action comprises removal of specified software on the mobile device.

19. The computer environment system in accordance with claim 13, wherein the disablement service comprises a cloud computing environment.

20. The computer environment system in accordance with claim 13, wherein the disablement service comprises a cluster of servers.

21. The computer environment system in accordance with claim 13, wherein the disablement service comprises a server.

22. The computer environment system in accordance with claim 13, further comprising a relevant decision module that determines whether general use of the cellular network is authorized.

23. The computer environment system in accordance with claim 22, wherein the relevant decision module comprises a cellular access management module at the cellular network that keeps track of whether the mobile device has general use authorization or restricted use authorization.

24. The computer environment system in accordance with claim 22, wherein the relevant decision module comprises a software module at the mobile device that, when activated, prohibits unrestricted use of the cellular network by the mobile device.

* * * * *